United States Patent [19]
Bello et al.

[11] Patent Number: 5,244,371
[45] Date of Patent: Sep. 14, 1993

[54] APPARATUS FOR FABRICATING GRIN LENS ELEMENTS BY SPIN MOLDING

[75] Inventors: James L. Bello; David P. Hamblen, both of Rochester, N.Y.

[73] Assignee: Eastman Kodak Company, Rochester, N.Y.

[21] Appl. No.: 826,351

[22] Filed: Jan. 27, 1992

Related U.S. Application Data

[62] Division of Ser. No. 622,016, Dec. 4, 1990, Pat. No. 5,122,134.

[51] Int. Cl.$^5$ ............................................. B29D 11/00
[52] U.S. Cl. ......................... 425/130; 425/135; 425/145; 425/174.4; 425/435; 425/808
[58] Field of Search ............... 425/130, 135, 145, 150, 425/159, 174.4, 435, 574–576, 808; 264/2.1, 311

[56] References Cited

U.S. PATENT DOCUMENTS

| | | | |
|---|---|---|---|
| 3,256,373 | 6/1966 | Horst | 264/2.1 |
| 3,718,383 | 2/1973 | Moore | 264/1.9 |
| 4,022,855 | 5/1977 | Hamblen | 264/1.7 |
| 4,451,507 | 5/1984 | Beltz et al. | 264/311 |
| 4,666,640 | 5/1987 | Neefe | 264/2.1 |
| 4,798,694 | 1/1989 | Sugata et al. | 264/311 |

FOREIGN PATENT DOCUMENTS 3726042  2/1989  Fed. Rep. of Germany.

*Primary Examiner*—Jay H. Woo
*Assistant Examiner*—James P. Mackey
*Attorney, Agent, or Firm*—Charles E. Snee, III

[57] ABSTRACT

An apparatus for producing a plastic lens element having a gradient index of refraction is disclosed in which first and second monomer-containing compositions, each having a different index of refraction, are injected into a centrifugal mold. Precise control of the gradient index is achieved by varying the ratio of the two monomers over a predetermined number of steps during the filling process.

6 Claims, 5 Drawing Sheets

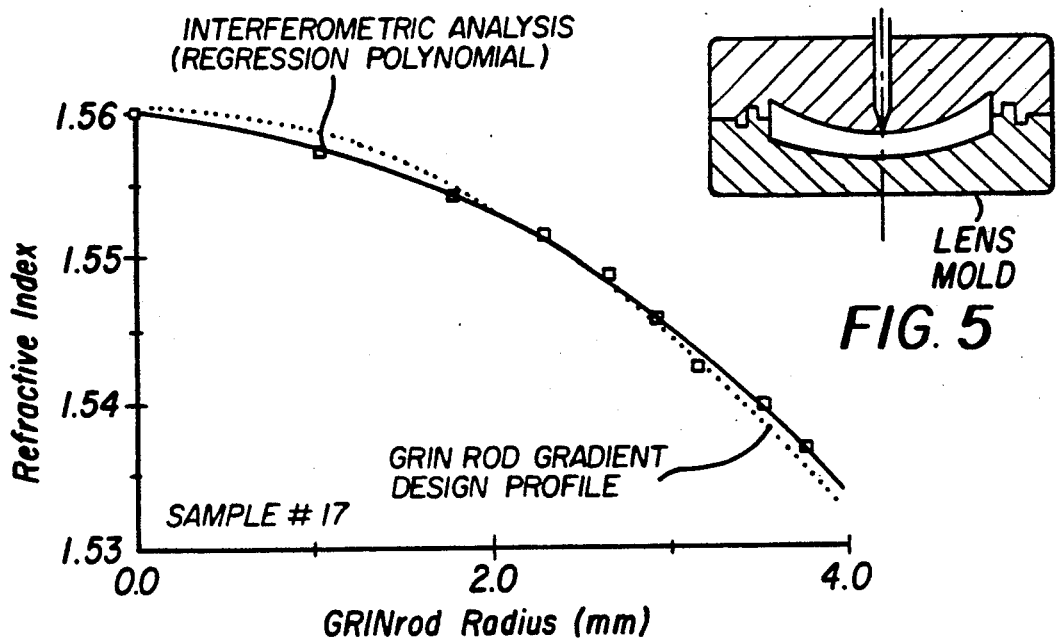
FIG. 6
FIG. 5
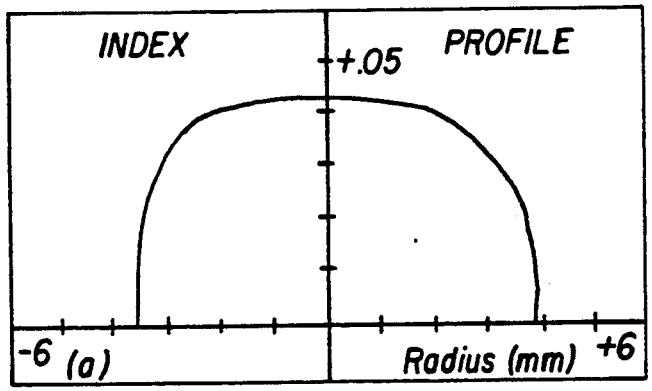
FIG. 7
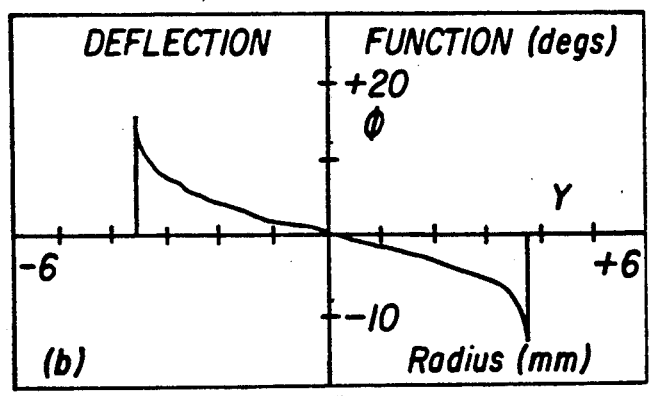
FIG. 8

APPARATUS FOR FABRICATING GRIN LENS ELEMENTS BY SPIN MOLDING

This is a divisional of application Ser. No. 622,016, filed Dec. 4, 1990, now U.S. Pat. No. 5,122,134, granted Jun. 6, 1992.

BACKGROUND

The invention relates to an apparatus for preparing a plastic lens element having a gradient index of refraction. More specifically, the present invention is directed to an apparatus for manufacturing a lens wherein first and second monomer-containing compositions, each having a different index of refraction, are injected into a centrifugal mold at a controlled ratio to produce a lens element having a gradient index of refraction.

The concept of a lens without curved refracting surfaces dates to the turn of the century R W. Wood showed that a cylindrical shaped medium, such as a gelatin, with a refractive index changing radially outward from its central axis converges or diverges light although the faces of the medium are flat (R.W. Wood, *Physical Optics*, Macmillan, N.Y., 86-91, 1905). In addition, Wood proved mathematically that the ideal refractive index gradient would be parabolic.

While Wood's work demonstrated that a gradient index (GRIN) lens was possible, a commercially viable method of producing custom GRIN lenses at reasonable costs has not been developed to date.

Three basic factors must be considered when attempting to develop a commercially viable GRIN lens manufacturing process: producing a large enough index change; controlling the gradient index shape; and reducing the time required to make a lens element. One established method of manufacturing a GRIN lens is to immerse a homogeneous alkali-silicate glass for predetermined time period in a molten salt bath containing a counter ion. In this binary diffusion process, ions from the molten salt migrate into the glass substrate and alkali ions from the glass exchange to enter the salt bath. The compositional change gives a change in refractive index as the exchange ions have a different polarization. A concentration gradient develops which in turn produces a gradient index profile. While the above described process does produce a GRIN lens, the diffusion process, even at elevated temperatures, can take hours or days, depending on the size of the desired lens element. Thus, while the process may be commercially viable for very large volumes, it is not commercially practical for manufacturing customized or low volume GRIN lens elements.

Attempts to overcome the deficiencies of the above-described glass diffusion process have led to the processes for manufacturing plastic GRIN lens elements. U.S. Pat. No. 4,022,855 issued to Hamblen on May 10, 1977, and incorporated herein by reference, discloses a method for making a plastic optical element having a gradient index of refraction wherein two copolymerizable monomer compositions containing monomers having different indices of refraction are combined in a mold to form a polymerization mixture. The polymerization mixture has an index of refraction varying radially outward from its axis of rotation. Hamblen discloses two specific processes for forming the polymerization mixture. The first process involves injecting a first monomer composition into the mold at a high speed of rotation, thereby forcing the first monomer composition radially outward against the walls of the mold cavity before and during the insertion of a second monomer composition into the central mold cavity. The speed of rotation is reduced after the second monomer composition is injected into the mold and rotation is continued over a predetermined period of time to allow the desired degree of molecular diffusion of one monomer composition into the other.

The molecular diffusion process, however, can be almost as time consuming as the glass ion diffusion process previously described and, as is the case of any diffusion process, the reproducibility of results can be a problem. In addition, it is not possible to provide adjustment of the gradient index across the lens with a diffusion process, i.e. the gradient index is fixed by the diffusion process. For example, it would be desirable to produce a parabolic gradient index profile which is the most desirable shape for aberration correction. FIG. 1, however, shows a typical refractive index profile produced by an ion diffusion lens; following the complimentary error function shape of a concentration gradient. The low index tail region of the diffusion curve is not useful for aberration correction and must be masked out of the field by an aperture or placement outside the active light region. Various schemes have been tried to force the gradient shape towards parabolic curvature, but these schemes have been unsuccessful.

The second method disclosed in Hamblen addresses some of the deficiencies of the diffusion processes discussed above by feeding the two monomer compositions into the mold simultaneously, but at different proportional rates during the filling process. Thus, the refractive gradient occurs without waiting for the diffusion of the two monomers. The present invention provides an improvement of the second method disclosed in Hamblen which permits the gradient index to be adjusted to any desired shape, thereby overcoming all of the deficiencies of the diffusion processes described above.

SUMMARY OF THE INVENTION

To circumvent difficulties associated with ion or molecular diffusion methods for making radial index gradients, the present invention employs an improved spin molding apparatus and method, hereinafter referred to as "differential monomer filling", to produce GRIN lens elements. More specifically, the present invention provides an apparatus for producing a plastic lens element having a gradient index of refraction by injecting first and second monomer containing compositions, each having a different index of refraction, into a centrifugal mold. Precise control of the gradient index is achieved by varying the ratio of the two monomers over a predetermined number of steps during the filling process.

In a preferred embodiment, volume arrays are created with a computer control unit for each of the monomer compositions based on the index of refraction of each monomer composition and a predetermined number of injection steps, step pump speeds required to dispense the required volume of monomer composition during each of the injection steps are then calculated by the computer control unit based on the volume arrays, the total stroke and end points for pumps that correspond to the monomer compositions are then calculated by the computer control unit based on the volume arrays, a motor coupled to a spin mold is then activated to rotate the spin mold at a predetermined fill speed, the pumps are controlled by the computer control unit to move from initialized positions to their respective end points at the step pump speeds, thereby filling a cavity provided in the spin mold with the monomer compositions to produce a gradient index of refraction.

Computerized control of the filling process provides a high degree of accuracy in the creation of the gradient index. Computer controlled filling also offers versatility by permitting the filling schedule to be rapidly and easily changed to create any desired gradient index.

BRIEF DESCRIPTION OF THE DRAWINGS

With the above as background, reference should now be made to the detailed description of the preferred embodiments and the accompanying drawings in which:

FIG. 5 illustrates an example of a spin mold that can be employed by the present invention to make a curved surface GRIN lens;

FIG. 6 illustrates an example of a gradient index profile for a GRIN rod fabricated in accordance with the present invention;

FIG. 7 illustrates a gradient index profile determined by traverse illumination;

FIG. 8 illustrates a deflection function; and

DETAILED DESCRIPTION OF THE PREFERRED EMBODIMENTS

The invention will be described with reference to the manufacture of GRIN rod lenses. It will be understood, however, that the invention is not limited to the manufacture of GRIN rod lenses and can be applied to produce any type of desired GRIN lens, including those having curved surfaces.

Figure 1:
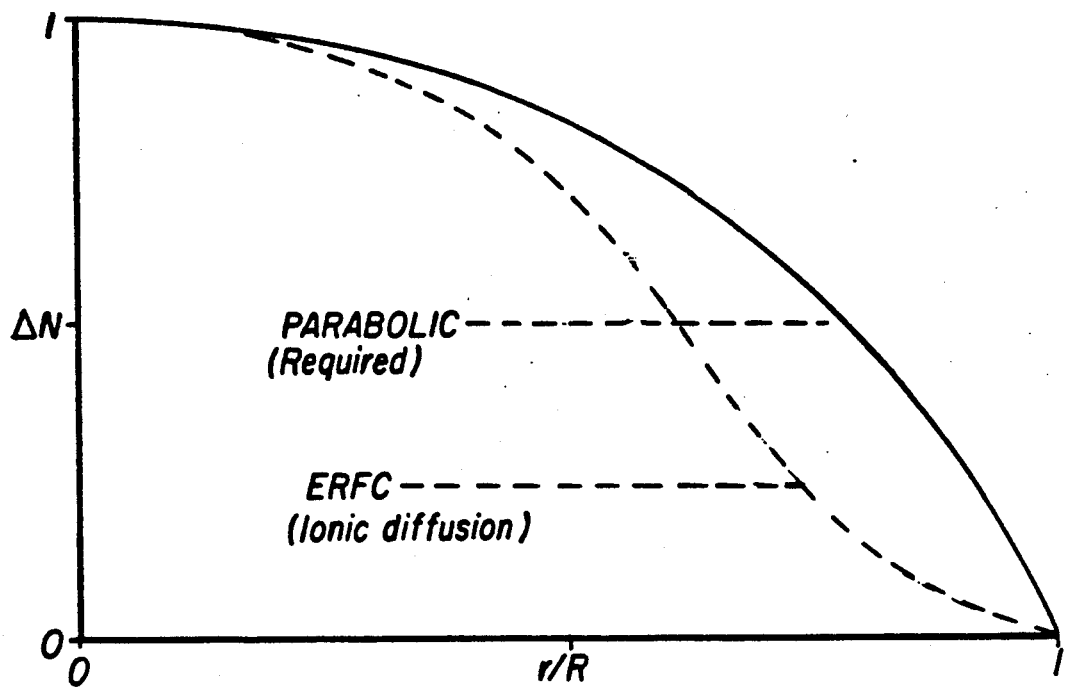
FIG. 1 illustrates a gradient index profile of a lens produced from a conventional ion diffusion process.
Figure 2:
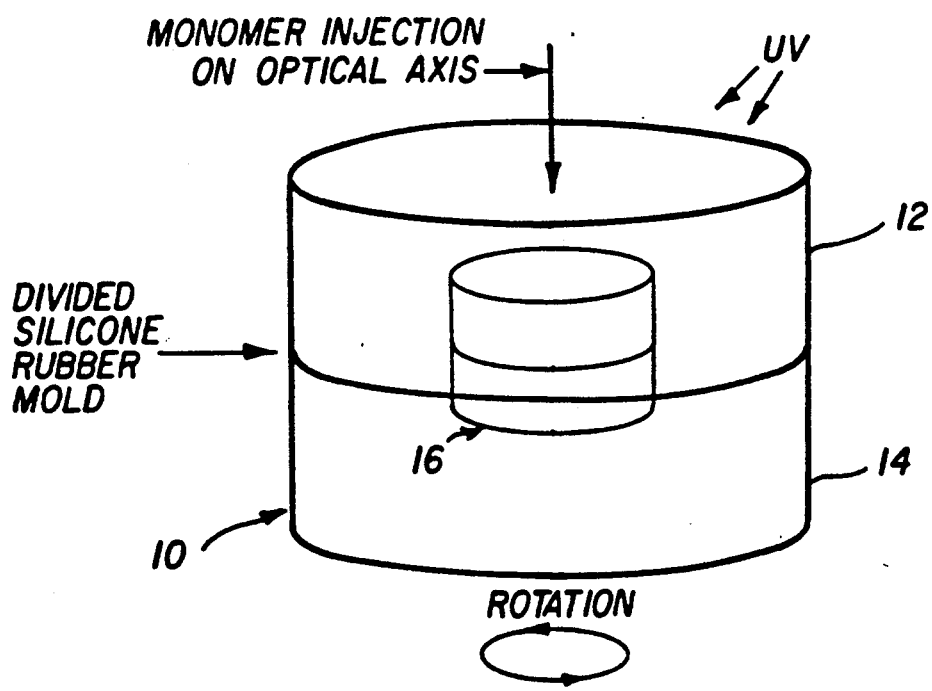
FIG. 2 illustrates a spin mold employed by the present invention.

A basic illustration of a spin mold 10 employed by the present invention is shown in FIG. 2. The spin mold 10 includes upper and lower mold inserts 12, 14 that define a central cavity 16 shaped in the form of a lens or GRIN rod to be produced. The cylindrical axis of the spin mold 10 becomes the center of symmetry or optical axis for the finished lens. Premixed monomers are injected on axis, through a sprue opening in the upper mold insert 12 as the spin mold 10 is rotated. The flow of the monomers is precisely controlled to change the relative proportions thereof, such that a predetermined concentration change occurs as the central cavity 16 of the spin mold 10 fills. The mixing of the monomers occurs from the outside edge of the central cavity 16 in toward the axis of rotation, as centrifugal force holds any liquid inserted into the central cavity 16 toward the outer edge thereof. In the illustrated example, a positive GRIN lens is produced by filling the central cavity 16 such that a high index of refraction occurs on axis with the gradient decreasing radially outwards. After filling of the central cavity 16, the spin mold 10 is irradiated with ultraviolet light (UV) to induce photopolymerization and form a hardened lens.

The above-described process provides several advantages including: 1) self centering of the gradient axis to the lens axis, 2) a reduction in fabrication time over diffusion processes, 3) no post grinding and polishing operation (unless there is a minute artifact left on the lens surface from the sprue opening), and 4) reusable molds. The mold inserts 12, 14 are formed of silicone rubber that is cast against a glass preform which can be shaped to any desired lens curvature. Baking, i.e. heating treating, of the finished lens while still in the spin mold 10 can be accomplished to produce a hardened, durable, and scratch resistant optical element.

Figure 3:
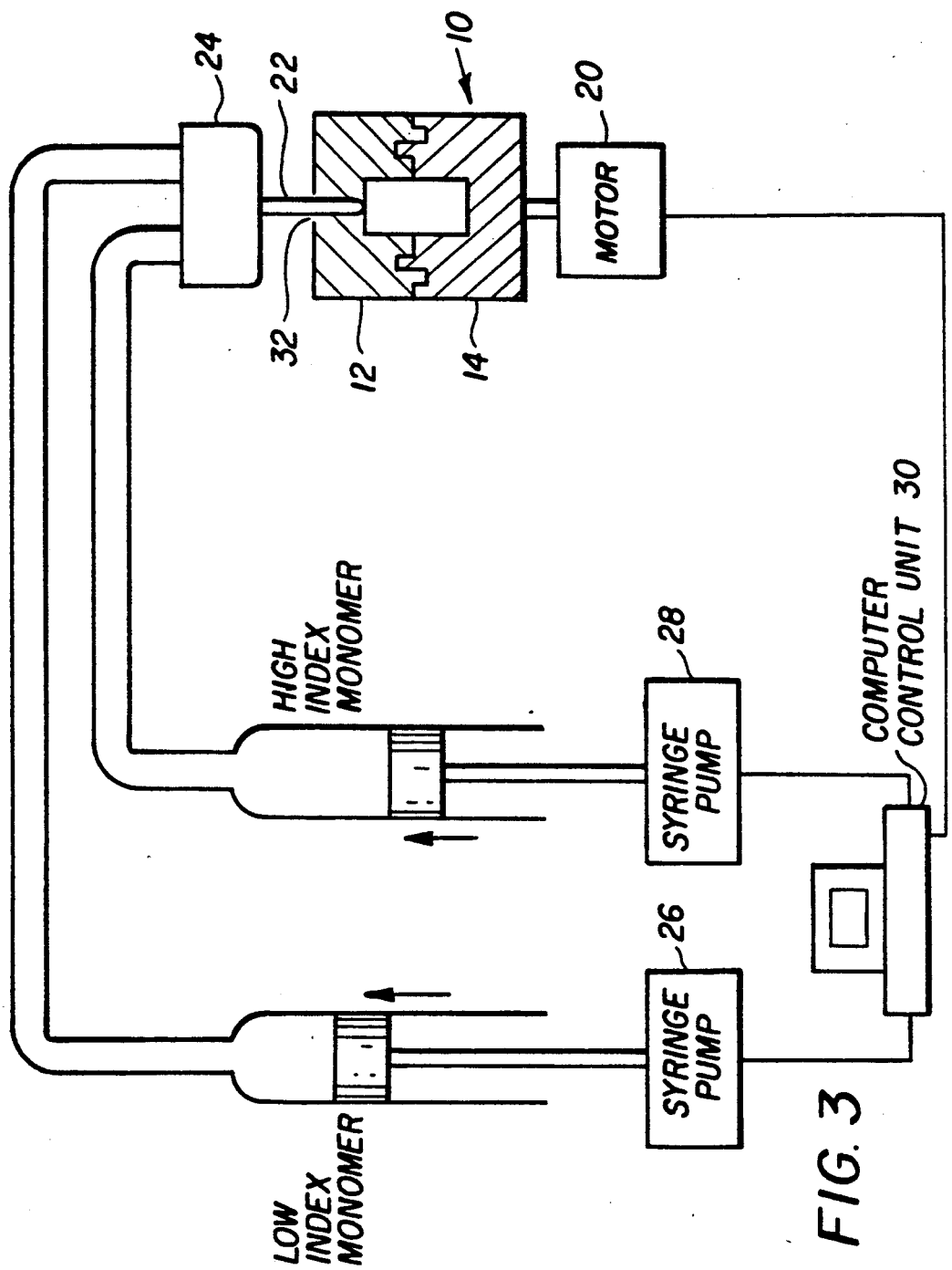
FIG. 3 is a schematic block diagram of a spin molding system in accordance with the present invention.

A more detailed description of an apparatus for performing the above described differential monomer filling process will now be provided with reference to FIG. 3, which shows a schematic block diagram of a spin molding system including a motor 20 [Headway Research Inc. spinner motor, 2000–10,000 RPM] coupled to a spin mold 10 of the type described above, a hypodermic needle injector 22 [Hamilton Corp. 22-gauge hypodermic needle] extending into the spin mold 10, a monomer micro mixing chamber 24 [The Lee Co. micro mixer, 10 micro liter capacity] coupled to the hypodermic needle injector 22, dual syringe-type step pumps 26 and 28 [Cavro Scientific Corp., 13,333 step lead screw] coupled to the micro-mixing chamber 24, and a computer control unit 30 [Hewlett-Packard HP-86B computer] coupled to the motor 20 and the dual syringe pumps 26 and 28. As mentioned above, the spin mold 10 includes upper and lower mold inserts 12, 14, each of which defines one half of the central cavity 16. The mold inserts 12, 14 are made by injecting rubber inside a LEXAN cylinder [General Electric Co. silicone rubber: RTV 615 (soft) and RTV 670 (hard)]. The upper mold insert 12 has sprue opening 32 to allow the hypodermic needle injector 22 to inject monomers into the central cavity 16. Both the central cavity 16 and sprue opening 32 are centered about the axis of rotation of the spin mold 10 which corresponds to the finished lens axis. The optical axis of the radial gradient is therefore self-centered to the center-of-curvature of the finished lens.

The monomers to be injected into the central cavity are premixed in the micro-mixer chamber 24 before entering the hypodermic needle injector 22. Predetermined proportions of the monomers are delivered from dual syringe pumps 26 and 28 under control of the computer control unit 30 as will be described in greater detail below. One syringe pump contains a high index monomer and one syringe pump contains a low index monomer. Selected monomers are listed in Table I, although it will be readily understood that others may be employed.

TABLE I

| Monomers | Refractive Index, Nd |
|---|---|
| PETA [Pentaerythitol triacrylate, Polysciences] | 1.4995 |
| CR-39 [Diallyl Diglycol Carbonate, PPG] | 1.5018 |
| HIRI-II [proprietary casting resin, PPG] | 1.5650 |
| DIP [Diallyl isophthalate, Polysciences] | 1.5700 |

The addition of photoactivators and thermocatalysts to the compositions in Table-I forms a hardened lens following UV photopolymerization and post baking. For example, UV sensitizers including, 1–4 wt. %, of either Darocure 1173, benzoin methyl ether, or Irgacure 184 are added as well as thermo activators such as benzoyl peroxide or benzophenone (4 wt. %) for post bake hardening.

A UV source, for example Oriel Corp. 1000 W lamp, is provided for photopolymerization of the monomer after injection into the central cavity. Complete UV hardening to a polymer is not required, since gelation will prevent monomer diffusion that might alter the gradient profile. Subsequent hardening by post baking is done in an oven ramped to 115° C. the over a two hour period, followed by a thermal soak for an additional two hours. The oven temperature is permitted to cool to ambient after the two hour soak. The cooling process generally takes about one hour.

Overall control of the above described system to produce a desired gradient index profile depends upon metering minute amounts of monomers into the spinning mold at the appropriate time. A pump control program module loaded in the computer control unit specifies the operation of the syringe pumps based on a desired gradient index profile and the index of refraction of the monomers to be employed. The actual filling of the central cavity 16 is accomplished by adjusting the proportion of the monomers 200 times or more during the filling process, i.e., filling of the central cavity 16 is divided into 200 equal volume steps in a preferred embodiment. This effectively yields 200 concentric cylinders, whose thickness increases as filling commences from the outside edge of the central cavity 16 towards the axis of rotation. The computer control unit first calculates the refractive index (i.e. concentration of monomers) for each of the 200 concentric cylinders in accordance with a predetermined gradient equation. The gradient equation is based on the type of lens element being produced. This may require that the system operator enter various equation parameters such as a desired lens radius and surface contour. The computer control unit then calculates the volume of each monomer required at each of the 200 steps based on the calculated refractive indices for the steps. Next, speed settings for each pump are calculated, such that sequential volumes are delivered in 1/200th of the total fill time, thereby maintaining a constant filling rate regardless of the amount of individual monomer added at any given step. After completion of the above calculations, the syringe pumps are set in motion and their speed is changed every 1/200th of the total fill time by the computer control unit to execute prior computed speed settings at each step. In other words, the computer control unit varies the operation speed of the pumps 200 times within the total filling period, such that the ratio of monomers is varied 200 times during the filling process.

Figure 4:
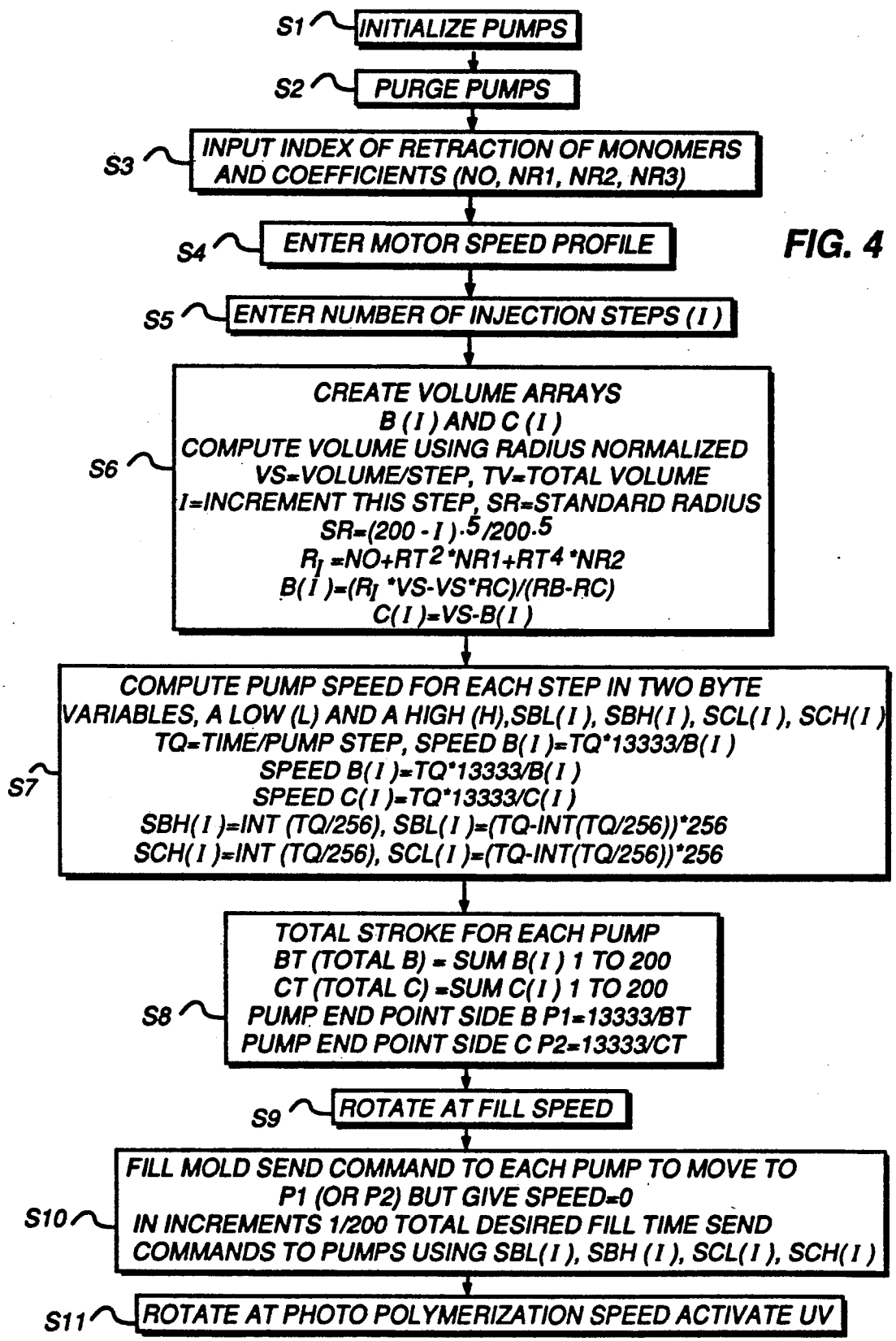
FIG. 4 is a flow chart of the operation of the system illustrated in FIG. 3.

A flow chart of the overall system operation as controlled by the computer control unit is provided in FIG. 4. At step S1 an initialization routine is performed to initialize the pumps. The pumps are then purged at step S2 to insure that all air bubbles are removed and any void volume is filled with the monomers. At step S3, the operator is asked to enter the index of refraction for the selected monomers and any parameters, such as lens radius or lens curvature, required for a desired lens equation previously loaded into the computer control unit 30. In the illustrated example, a polynomial expression is used to describe the index curve as function of radius and the operator enters coefficients N0, NR1, NR2, NR3. A motor speed profile is also entered by the operator at step S4 which defines the desired speed and hold time for the motor during the filling process and the photo polymerization process. The operator enters the desired number of injection steps (I) in step S5. The number of injection steps may alternatively be pre-loaded as a constant. While the illustrated embodiment employed 200 injection steps, the number of injection steps can be varied to produce any desired gradient index. The computer control unit 30 then creates volume arrays for each of the monomers [B(I) and C(I)] in step S6. The volume arrays indicate the volume of each monomer required at each injection step to produce the desired index of refraction. The computer control unit 30 then calculates the pump speed required to dispense the required volume of monomer during each of the injection steps in step S7. In the illustrated example, the pump speed is defined as two byte variables SBH(I) and SBL(I) for the "B" monomer and SCH(I) and SCL(I) for the "C" monomer. The total volume or stroke for each of the pumps is then calculated and used to determine the end point for each pump in step S8. At this point, the system is initialized and the filling of the spin mold 10 can begin. The computer control unit 30 activates the motor in step S9 to rotate the spin mold 10 at the fill speed specified in step S4. The computer control unit 30 then sends a command in step S10 to the syringe pumps 12, 14 to move from their initialized position to the endpoint calculated in step S8. Initially, the computer control unit 30 indicates that the pumps should move at essentially a zero speed, but the computer control unit 30 then commands the pumps to move at the speeds calculated in step S8 for each of the specified increments of the total fill time. Once filling is complete, the computer control unit 30 commands the motor to rotate at the speed indicated in step S4 for the photo polymerization step and activates the UV source in step S11.

It will be recognized by those skilled in the art that the particular equations utilized for the illustrated example can be varied to produce any type of lens. As previously stated, the invention is not limited to the production of GRIN rod elements but can also be used to produce lens elements having curved surfaces. FIG. 5, for example, illustrates a spin mold for producing a curved surface lens. In such a case, the radius of curvature of the inner and outer surface of the lens and the desired thickness or height of at the center of the lens would be used to calculate the volume of the lens at any desired aperture.

TESTING METHODS

Two methods were used to measure refractive index gradients of lenses produced by the above described process: monochromatic light interference and traverse illumination technique (traverse spatial filtering). In the first, a destructive test, thin samples diced from GRIN-rods were placed in one light beam path of a Mach-Zehnder interferometer. In the second, a nondestructive test, light refraction from a focused laser beam was detected when scanned across the GRIN rod, orthogonal to its optical axis using a P102 Profile Analyzer from York, Ltd. The resulting ray bending caused by internal index differences, calculating by means of a mathematical transform (Abelian Integral Transform), reconstructs the gradient profile responsible for a measured beam deflection function.

Disk samples were prepared for interferometer analysis by thin sectioning graded rods with a wire saw and rough polishing opposite faces. When placed in a cuvette with optical grade parallel windows and immersed in low index oil, unpolished sample surfaces did not hinder distinguishing between light and dark interference fringes. GRINrod cross sections measuring 150–250 μm thick displayed concentric ring patterns due to the gradient index change when illuminated at λ=0.6328 μ/m. Each interference ring results from an incremental index change $\Delta N = \lambda/(D)$, where λ is the wavelength of incident laser illumination and D is disk thickness. Measuring the distance between fringes and plotting accumulated index change versus separation was used to reconstruct the gradient profile.

Interference fringe patterns resolved by interferometry were imaged via a video camera with monitor, then captured by a frame grabber/digitizer board [Targa MB, At&T True Vision Advanced Raster Graphic Adapted], installed in a Compaq 386/20 PC. Densitometer and fringe scaling analysis was rendered by a line scan profile software program called JAVA available from Jandel Scientific Corporation. From this data, a 4th order polynomial equation described the gradient profile as a function of radial distance r:

$$N(r) = No + N1 \cdot r^2 + N2 \cdot r^4, \quad r^2 = x^2 + y^2 \quad (1)$$

where N1 & N2 are coefficients, and No is the base refractive index on axis. Gradient coefficients were determined from regression analysis of JAVA data using a program called MathCAD from MathSoft Inc.

Gradient profiles provided by a York Profile Analyzer were originally designated for the optical fiber industry. Glass rod preforms, from which hair thin fibers are drawn, have weakly refracting gradients compared to a GRIN lens. Therefore, light refraction was outside the solid angle subtended by the York analyzer's detector. A smaller sealed cuvette container was fabricated to surround the sample with a higher index oil than used in the main sample chamber. This raised the reference baseline from N=1.4588 to >N=1.50, narrowing the acceptable collection angle to the detector. Except for edge-rounding error due to surface curvature, a representative gradient index profile was computed from the laser beam deflection function.

Lens bench performance analysis of GRIN rods determined focus quality at infinite conjugate with respect to spot size. Beam scans at point of best focus gave spot diameter at FWHM (full width, half maximum) and ar 1/e² using a Photon Technology Beam Scan Model 1080.

EXPERIMENTAL RESULTS

Large GRIN rods measuring 9.5 mm long by 7.58 mm diameter were made by the spin molding process described above. Although the initial mold cavity was larger (9.98 mm×8.0 mm diam.), about 5% shrinkage following polymerization reduced over all dimensions of the finished GRIN rods. Optical grade surface quality on GRIN rod faces resulted through surface transfer from silicone rubber mold to rod. Some GRIN rods had an artifact located next to the entrance of the sprue port which usually consisted of a small projection. These artifacts appeared as the hypodermic needle injector wore a larger sprue opening in the silicone rubber at the entrance to the mold cavity after repeated fillings, thereby allowing monomer to enter the sprue opening and hardening. The artifacts could be easily removed by polishing.

Focal lengths of GRIN rods corresponded to the intended design, in the range of 25 to 30 mm. Longitudinal spherical aberration measured 3 mm, indicating deviations from the optimized gradient index profile. Because a Wood-lens is not a perfect imager, barrel distortion was large, as expected. Theoretical spot size at focus should be 2.8 μm. However, minimum spot sizes from measurements gave 12–20 μm FWHM (50% peak height), with a considerable amount of beam power dissipated over the profile's base. This loss of peak intensity must be attributed to uncorrected aberrations in the GRIN rods.

Graded doublet lenses showed improved focus. Spot size measurements gave 6.74 μm FWHM (full width, half maximum) and a diameter of 15.7 μm at 1/e². A homogeneous miniature Ealing lens showed 28.2 μm FWHM spot size without the GRIN rod addendum. Focused laser beam profiles for an optimized graded doublet should have been submicron according to computer ray tracing calculations. Resolving profiles near and below one micron with accuracy, however, were outside the range of the Photon measuring instrument employed.

Lenses diced and analyzed by interferometry showed a close correspondence between the experimental gradient profile and desired profile. An example is shown in FIG. 6. Although the accuracy in measuring gradient profiles needs improvement, a least squares polynomial fitted to the interference fringe data gave a close resemblance to the design profile.

Gradient profiles taken by a York Profile Analyzer produced shapes similar to the example shown in FIG. 7. The beam deflection function, dφ/dy (radians), resulting from traverse illumination across the diameter of a GRIN sample by focused laser beam is shown in FIG. 8. The maximum index change ΔN is measured from the slope of the deflection function, $$\Delta N = [d\phi(y)/2][n(core)/n(clad)] \quad (2)$$

where n(core) is the high index oil surrounding the graded sample and n(clad) is the outer cell index oil. From the shape of the deflection function a mathematical transform converts angular beam refraction to gradient profile.

Figure 9:
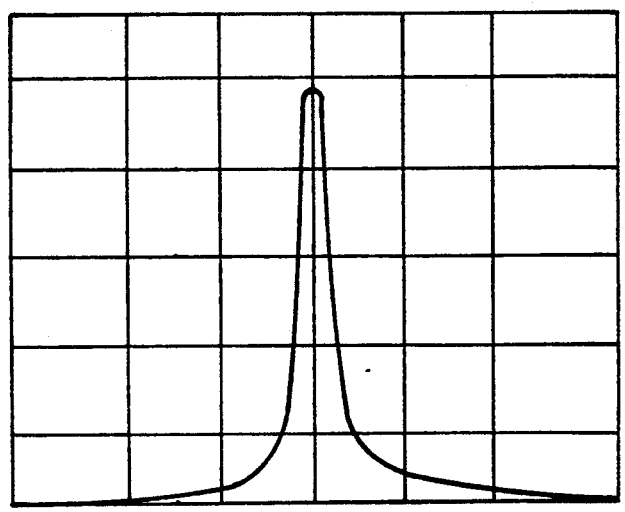
FIG. 9 shows a line spread function profile of a GRIN rod.

An example scan profile taken by the Photon Technology analyzer at the focal point of a large GRINrod is shown in FIG. 9. Some profiles gave indications of internal gradient structures, such as ring patterns, indicating that sometimes the gradient was not smooth.

An interference pattern from the Mach-Zehnder interferometer showed substantially circular rings. The sample disk was cut by wire saw orthogonal to the GRIN rod axis, polished to a thickness of >200 μm, then mounted flat and submersed in index oil within the cuvette.

SUMMARY OF TEST RESULTS

The present invention provides an improved apparatus for making graded lenses with radial index gradients. Filling the lens volume of the mold. i.e. the central cavity, by differentially mixing two monomers under precision control allows a variation in composition that corresponds to the desired parabolic shaped gradient. Only occasional post polishing is necessary because the hardened lens has surfaces which replicate the original silicone rubber mold surfaces. Lenses having diameters up to 18 mm have been molded, but the maximum diameter lens that can be produced by the invention is not limited to this range. A lens thickness limitation is imposed due to required UV penetration used for photo polymerization of the injected monomers, although this situation may be remedied by use of new micro wave polymerization techniques. GRIN lenses 8.0 mm thick, however, have been produced with index differences of $\Delta N \leq 0.06$.

The computerized operation of the dual syringe pumps provides significant improvement in control of the monomer injection into the rotating mold. In the illustrated embodiment, the gradient profile is described by a fourth-order polynomial equation which allows the operator to shape the concentration profile across the lens radius. Higher ordered polynomials are equally capable of being handled if desired. Therefore, the gradient distribution can be altered to meet that required from optical ray-tracing design. In addition, a true parabolic gradient is formed, rather than an error function shape produced by binary ion diffusion into glasses.

The invention reduces mold fill times to 100 seconds or less due the accurate precision filling. In addition, the total fabrication time, including UV exposure, is reduced to about ten minutes, which is far superior to conventional diffusion processes. The ten minute fabrication time, of course, does not include any time that may be required for post thermal hardening (typically five hours as described above).

Optical performance of a GRIN rod, measuring 9.5 mm long by 7.58 mm diameter, gave a focal length of 30 mm and a focused spot size of 12–20 $\mu$m FWHM. A graded doublet lens, 5 mm diameter, showed improved focusing over a plano/convex glass singlet. Focus spot size was reduced from 28 $\mu$m in the unaided lens, compared to 6.7 $\mu$m with the doublet combination. Measurement of gradient profiles in samples, both by interferometry and traverse spatial filtering, showed close relationship between experimental gradients to the desired gradient shape. If index gradients are exactly replicated, optical design performance established that it is possible to achieve near diffraction limit to 1000 cycles with GRIN lens optics. Attaching a GRIN lens to a non-graded lens presents the possibility of correcting aberrations inherent to single-element lenses.

The invention has been described with reference to certain preferred embodiments thereof. It will be understood, however, that modifications and variations are possible within the scope of the appended claims. For example, the illustrated embodiment utilized an interactive approach to have an operator select various process parameters. All of the parameters entered by the operator, however, can be preloaded into the computer control unit so that the system operation is completely automatic.

What is claimed is:

1. An apparatus for producing gradient index lens elements, said apparatus comprising:
   a spin mold coupled to a drive motor, the spin mold including a central cavity with a sprue opening;
   at least two monomer step pumps for at least first and second monomer compositions having different indices of refraction;
   a micro-mixer chamber coupled to the monomer step pumps;
   a hypodermic needle injector coupled to the micro-mixer chamber and extended through the sprue opening into the central cavity of the spin mold; and
   a computer control unit coupled to the monomer step pumps and the drive motor, the computer control unit comprising means for controlling the speed of the monomer step pumps, over a predetermined number of incremental steps during a fill operation, to dispense different rations of the at least first and second monomer compositions into the micro-mixer chamber and also to dispense a predetermined liquid volume of a resultant mixture of the monomer compositions into the spin mold, to form a lens element having a gradient index of refraction.

2. An apparatus as claimed in claim 1, wherein the computer control unit comprises means for commanding the drive motor to rotate the spin mold at a predetermined fill speed during the fill operation.

3. An apparatus as claimed in claim 2, wherein the computer control unit comprises means for commanding the drive motor to change the speed of rotation of the spin mold from the speed during the fill operation to a predetermined photo-polymerization speed after completion of the fill operation.

4. An apparatus as claimed in claim 3, further comprising an ultraviolet unit, wherein the computer control unit comprises means for activating the ultraviolet unit after commanding the drive motor to rotate the spin mold at the predetermined photo-polymerization speed.

5. An apparatus for manufacturing a gradient index lens element by combining at least two monomer compositions in a spin mold, the apparatus comprising:
   at least two monomer step pumps for at least first and second monomer compositions having different indices of refraction;
   a micro-mixer chamber coupled between the monomer step pumps and a spin mold;
   means for creating volume arrays for each of the monomer compositions based on the radius and total lens volume of the gradient index lens element to be manufactured, the index of refraction of each monomer composition and a selected number of injection steps;
   means for calculating speeds for the step pumps required to dispense a predetermined liquid volume of monomer composition into the micro-mixer chamber and to dispense a resultant mixture of the monomer compositions from the micro-mixer chamber into the spin mold during each of the injection steps based on the volume arrays;
   means for calculating the total stroke and end points for the step pumps that correspond to the monomer compositions based on the volume arrays;
   means for activating a motor coupled to the spin mold to rotate the spin mold at a selected fill speed; and
   means for controlling the step pumps, based on the calculated total stroke and end points, to move from initialized positions to their respective end points at the step pump speeds, thereby dispensing the monomer compositions into the micro-mixer chamber and filling a cavity provided in the spin mold with a resultant mixture of the monomer compositions to produce a lens elements having a gradient index of refraction.

6. An apparatus as claimed in claim 5, wherein said means for activating comprises means for controlling the motor to rotate at a predetermined photo-polymerization speed, further comprising an ultraviolet unit and means for activating the ultraviolet unit to photopolymerize the monomer compositions within the cavity of the spin mold.

* * * * *